(12) United States Patent  
Mills

(10) Patent No.: US 11,449,137 B2
(45) Date of Patent: Sep. 20, 2022

(54) SOLDIER AND SURFACE VEHICLE HEADS-UP DISPLAY IMAGERY COMPENSATION SYSTEM TO ALIGN IMAGERY WITH SURROUNDINGS

(71) Applicant: Rockwell Collins, Inc., Cedar Rapids, IA (US)

(72) Inventor: Martin Mills, Reading (GB)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 17/174,711

(22) Filed: Feb. 12, 2021

(65) Prior Publication Data

US 2022/0261067 A1 Aug. 18, 2022

(51) Int. Cl.
*G06F 3/01* (2006.01)
*H04N 13/332* (2018.01)
*G06T 3/60* (2006.01)

(52) U.S. Cl.
CPC .............. *G06F 3/012* (2013.01); *G06T 3/60* (2013.01); *H04N 13/332* (2018.05)

(58) Field of Classification Search
CPC .......... G06F 3/012; H04N 13/332; G06T 3/60
See application file for complete search history.

(56) References Cited

U.S. PATENT DOCUMENTS

| 8,970,495 | B1* | 3/2015 | Biffle ..................... G09G 3/003 345/158 |
| 9,213,185 | B1* | 12/2015 | Starner ................ G02B 27/017 |
| 9,442,564 | B1 | 9/2016 | Dillon |
| 9,595,083 | B1 | 3/2017 | Smith et al. |
| 9,706,086 | B2 | 7/2017 | Lawrence |
| 10,078,367 | B2 | 9/2018 | Michail et al. |
| 11,145,079 | B2* | 10/2021 | Allu ......................... G06T 7/11 |
| 2002/0082498 | A1* | 6/2002 | Wendt .................. G16H 40/67 348/E13.059 |
| 2002/0113755 | A1* | 8/2002 | Lee ......................... G02B 7/12 345/7 |

(Continued)

FOREIGN PATENT DOCUMENTS

IN 5635CHENP2015 A 8/2016

OTHER PUBLICATIONS

Extended Search Report in European Application No. 22156603.7 dated Jul. 1, 2022, 10 pages.

*Primary Examiner* — Dmitriy Bolotin
(74) *Attorney, Agent, or Firm* — Suiter Swantz pc llo

(57) ABSTRACT

A system for rendering a heads-up display element oriented to the surrounding terrain to alleviate cognitive fatigue and eye strain defines buffer regions around a useable region. An orientation element tracks the movement and/or orientation of the user's head and adjusts the useable region via corresponding movements within the buffer regions to align the useable region with the terrain. The orientation element may include a motion tracking camera, micro-electromechanical motion tracking device, etc. Text within the useable region is anchored to a relative location with respect to the horizon for small movements via small translations of the useable region within the buffer regions. For larger movements, the useable is allowed to drift outside the display area completely, and gradually dragged back to a default location according to some time function.

16 Claims, 5 Drawing Sheets

Display Area Concept

(56) References Cited

U.S. PATENT DOCUMENTS

| | | | |
|---|---|---|---|
| 2011/0248904 A1* | 10/2011 | Miyawaki | G06T 19/006 |
| | | | 345/7 |
| 2013/0127980 A1* | 5/2013 | Haddick | G06F 3/013 |
| | | | 348/14.08 |
| 2013/0293468 A1* | 11/2013 | Perez | G06F 3/033 |
| | | | 345/158 |
| 2015/0235453 A1 | 8/2015 | Schowengerdt et al. | |
| 2015/0271408 A1* | 9/2015 | Cancel Olmo | G06F 1/1626 |
| | | | 348/208.6 |
| 2015/0309316 A1* | 10/2015 | Osterhout | G06F 3/014 |
| | | | 345/8 |
| 2016/0027212 A1* | 1/2016 | Da Veiga | G06T 19/006 |
| | | | 345/633 |
| 2016/0210784 A1 | 7/2016 | Ramsby et al. | |
| 2017/0064157 A1* | 3/2017 | Lawrence | H04N 5/23248 |
| 2017/0123215 A1* | 5/2017 | Li | G06F 3/038 |
| 2018/0074329 A1* | 3/2018 | Kazansky | H04N 5/2256 |
| 2018/0181196 A1* | 6/2018 | Lee | H04N 5/225251 |
| 2019/0279428 A1* | 9/2019 | Mack | G06T 7/90 |
| 2019/0317659 A1* | 10/2019 | Johnson | G06F 1/163 |
| 2019/0333480 A1* | 10/2019 | Lang | G06F 3/011 |
| 2019/0358547 A1* | 11/2019 | Mack | H04N 21/2187 |
| 2021/0157144 A1* | 5/2021 | Tominaga | G02B 27/0172 |
| 2021/0271077 A1* | 9/2021 | Huber | B60K 35/00 |
| 2021/0343764 A1* | 11/2021 | Miyamoto | H04N 5/3698 |
| 2022/0030177 A1* | 1/2022 | Newman | H04N 5/23254 |

* cited by examiner

SOLDIER AND SURFACE VEHICLE HEADS-UP DISPLAY IMAGERY COMPENSATION SYSTEM TO ALIGN IMAGERY WITH SURROUNDINGS

BACKGROUND

Head mounted displays allow a user to have continuous access to information without looking away from a scene of interest. However, existing head mounted displays can cause eye strain, sickness, and mental fatigue in users due to a mismatch in the presentation of the head mounted display and the view of the actual horizon. The user's brain naturally processes a scene to compensate for minor movements such as head tilted; within the naturally compensated scene, the heads-up display appears crooked. Likewise, when walking and moving, the user's brain naturally de-bounces the image and the heads-up display appears to bounce in relation to environment.

Users may feel compelled to stop and remain as still as possible to comfortably read the heads-up display, reducing the overall usefulness. It would be advantageous if a system existed for more naturally aligning the heads-up display with the natural scene.

SUMMARY

In one aspect, embodiments of the inventive concepts disclosed herein are directed to a system for rendering a heads-up display element oriented to the surrounding terrain to alleviate cognitive fatigue and eye strain. The heads-up display element defines buffer regions around a useable region. An orientation element tracks the movement and/or orientation of the user's head and adjusts the useable region via corresponding movements within the buffer regions to align the useable region with the terrain. The orientation element may include a motion tracking camera, microelectromechanical motion tracking device, etc.

In a further aspect, text within the useable region is anchored to a relative location with respect to the horizon for small movements via small translations of the useable region within the buffer regions. For larger movements, the useable is allowed to drift outside the display area completely, and gradually dragged back to a default location according to some time function.

It is to be understood that both the foregoing general description and the following detailed description are exemplary and explanatory only and should not restrict the scope of the claims. The accompanying drawings, which are incorporated in and constitute a part of the specification, illustrate exemplary embodiments of the inventive concepts disclosed herein and together with the general description, serve to explain the principles.

BRIEF DESCRIPTION OF THE DRAWINGS

The numerous advantages of the embodiments of the inventive concepts disclosed herein may be better understood by those skilled in the art by reference to the accompanying figures in which.

DETAILED DESCRIPTION

Figure 1A:
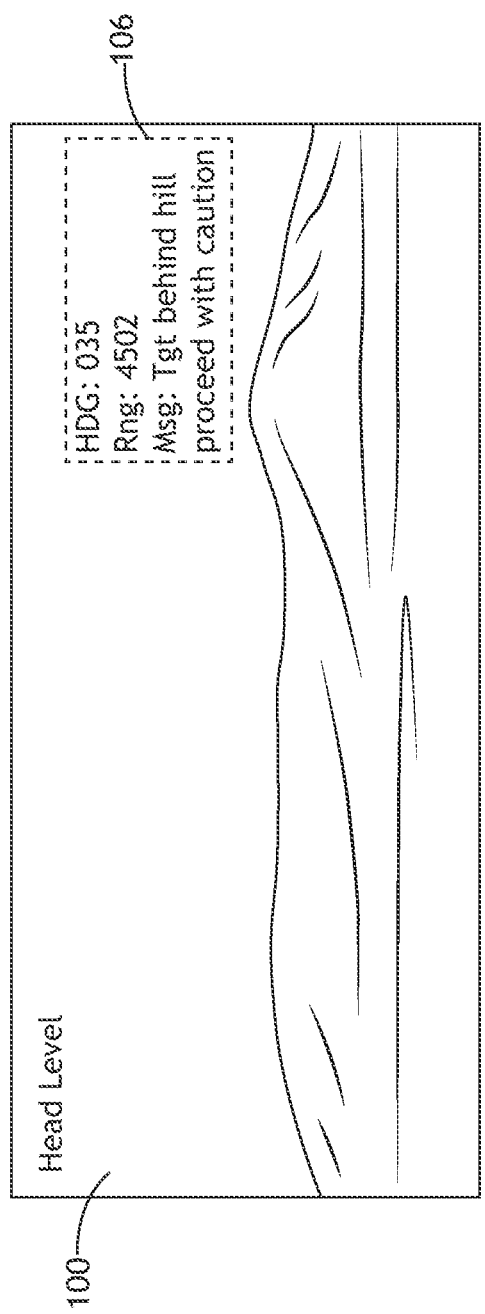
FIG. 1A shows a representation of a view including elements of a heads-up display.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to a system for rendering a heads-up display element oriented to the surrounding terrain to alleviate cognitive fatigue and eye strain. The heads-up display element defines buffer regions around a useable region. An orientation element tracks the movement and/or orientation of the user's head and adjusts the useable region via corresponding movements within the buffer regions to align the useable region with the terrain. The orientation element may include a motion tracking camera, micro-electromechanical motion tracking device, etc.

In a further aspect, text within the useable region is anchored to a relative location with respect to the horizon for small movements via small translations of the useable region within the buffer regions. For larger movements, the useable is allowed to drift outside the display area completely, and gradually dragged back to a default location according to some time function.

Figure 1B:
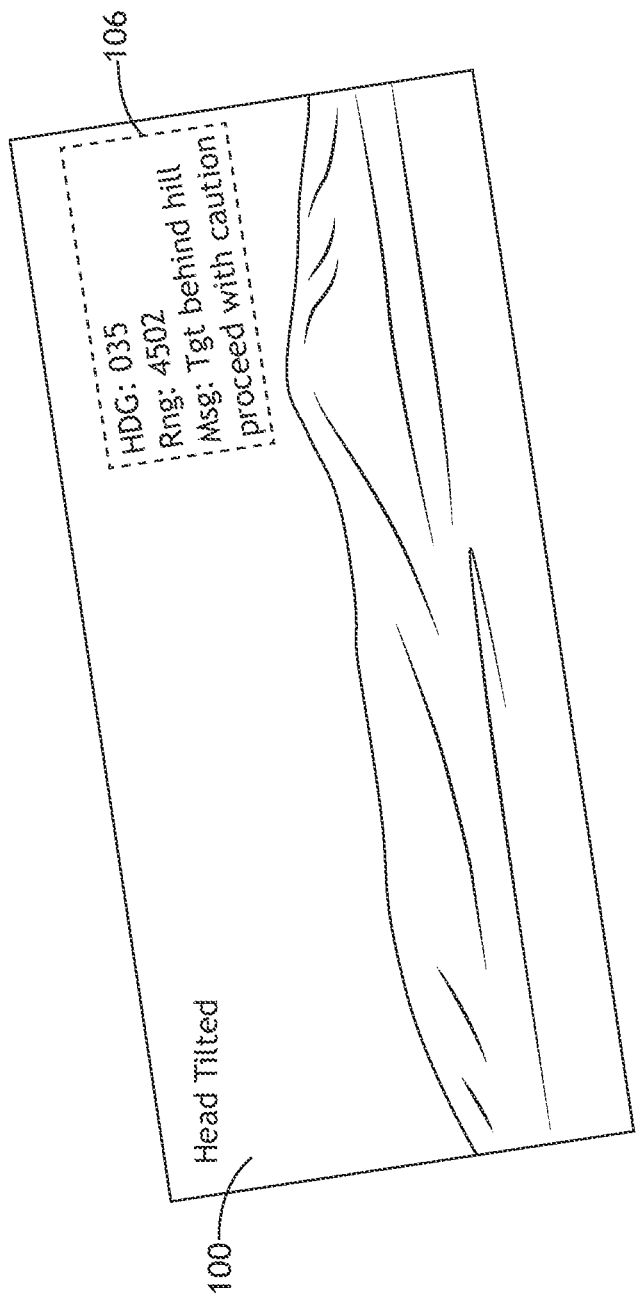
FIG. 1B shows a representation of a view including elements of a heads-up display.
Figure 1C:
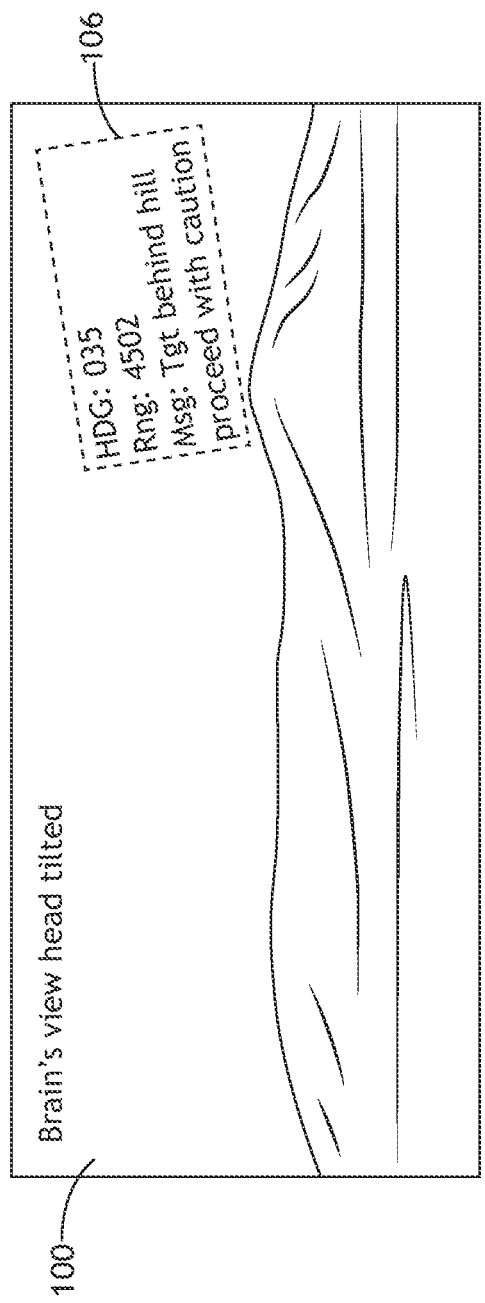
FIG. 1C shows a representation of a view including elements of a heads-up display.

Referring to FIGS. 1A-1C, representations of a view including elements of a heads-up display are shown. Heads-up displays that render text or image elements 106, 108, 110 over actual terrain 100, 102, 104 may cause eye strain or cognitive fatigue as the user mentally adjusts scenes to compensate for minor head movements so that the user interprets the terrain as substantially stationary; however, the rendered text or image elements 106, 108, 110, not being part of the terrain, appear to move relative to the terrain even though they are stationary with respect to the user's head (as in FIG. 1C).

Figure 2:
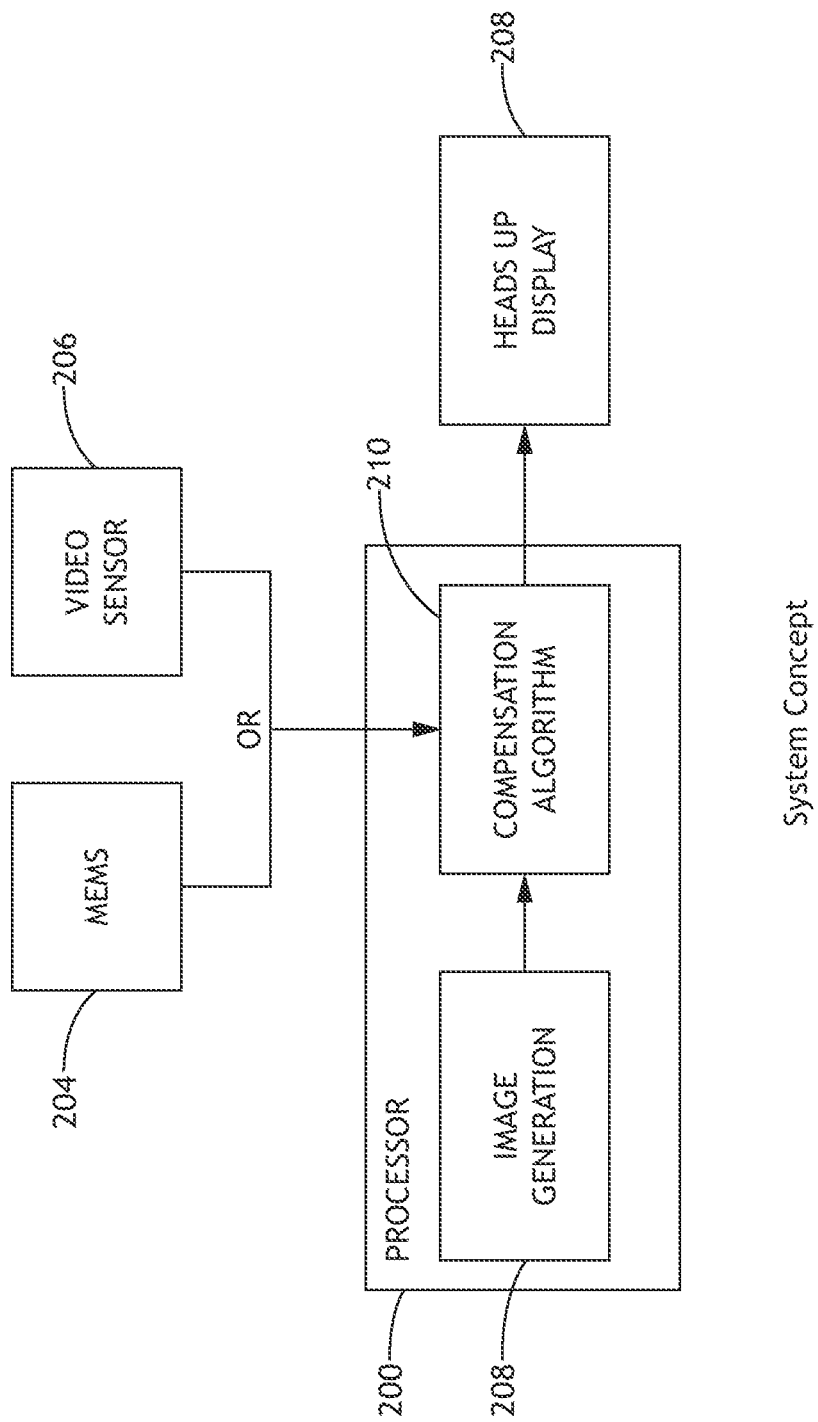
FIG. 2 shows a block diagram of a system for implementing exemplary embodiments of the present disclosure.

Referring to FIG. 2, a block diagram of a system for implementing exemplary embodiments of the present disclosure is shown. The system comprises a processor 200 connected to a heads-up display 202 and at least one position and orientation element 204, 206. The processor 200 defines a useable region of the viewable area of the heads-up display 202 and at least one buffer region surrounding the useable region. An image generation process 208 renders images in the useable region. In at least one embodiment, the processor 200 may receive images to render and the image generation process 208 scales the received images to fit the useable region.

In at least one embodiment, a compensation process 210 receives position and orientation data from the at least one position and orientation element 204, 206, and determines a translation or rotation to the usable region to keep the useable image in a relatively fixed location with respect to the terrain as seen through the heads-up display. The compensation process 210 may constrain the translation or rotation within the buffer region so that rendered image is never cut-off or otherwise truncated.

In at least one embodiment, the processor 200 may enlarge the useable region (reduce the at least one buffer region) based on some trendline of recent translations and rotations; that is to say if the user's head has been very stable with minimal translation or rotation being employed to orient the useable region, the useable region may be enlarged to make the useable region more clearly visible. In such embodiments, the processor 200 may also be configured to quickly reduce the useable region back to some default size when instantaneous motion is identified via the at least one position and orientation element 204, 206.

In at least one embodiment, when motion is identified via the at least one position and orientation element 204, 206 that cannot be compensated via translation or rotation within the at least one buffer region (motion so significant, translation to maintain a fixed location with respect to the terrain would cause the image to leave the viewable area), the compensation process 210 may apply a time and angular distance dependent dragging function to allow the useable region to leave the viewable area while also being disassociated from the fixed location with respect to the terrain and smoothly translated back to the viewable area over time. The useable region may then be associated with a new fixed location with respect to the terrain.

In at least one embodiment, the compensation process 210 may only compensate for orientation changes by applying a rotation to the useable region, especially where the user routinely employs fast head movements and constant translation tends to make the useable region frequently leave the viewable area.

Position and orientation elements 204, 206 may comprise one or more microelectromechanical motion tracking devices 204, outward facing motion tracking cameras 206, or both. It may be appreciated that the computational overhead of motion tracking cameras 206 may be undesirable or sufficiently slow that a bifurcated system of fast, low granularity motion tracking and slow, higher granularity motion tracking via different systems may be employed. Furthermore, in a closed environment, inward facing motion tracking cameras 206 may also be employed with the added step of transforming the identified movement to a point centered on the user based on the known locations of the cameras. Motion tracking cameras 206 may identify a set of reference points for motion tracking via various image processing algorithms and compare those reference points frame-to-frame.

Figure 3:
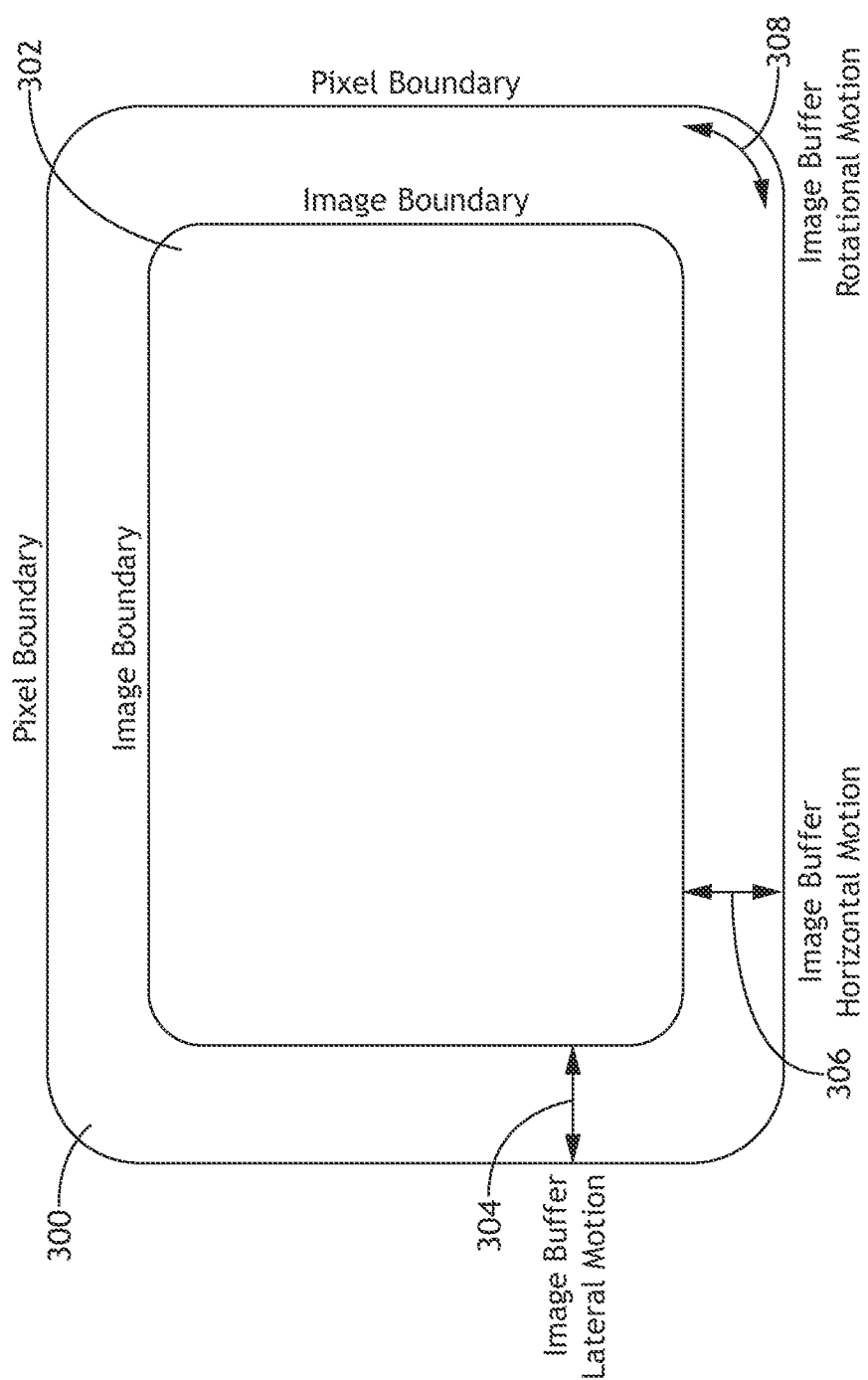
FIG. 3 shows a representation of a heads-up display element according to an exemplary embodiment.

Referring to FIG. 3, a representation of a heads-up display element according to an exemplary embodiment is shown. The heads-up display defines a useable region 302 and at least one buffer region 300 surrounding the useable region 302; in at least one embodiment, the useable region 302 may be approximately 10-20% smaller than the total viewable area. Image streams send to the heads-up display are generally constrained to the useable region 302 and the useable region 302 itself is translated and/or rotated into the areas defined by the at least one buffer regions 300 based on a compensation algorithm utilizing position and orientation data from one or more sensors.

In at least one embodiment, the buffer region 300 may define a lateral buffer portion 304 to allow the useable region to translate side-to-side and a vertical buffer portion 306 to allow the usable region to translate up-and-down. Furthermore, the at least one buffer region 300 defines an area to allow for rotational motion 308 of the useable region 302 without truncating or otherwise obscuring the useable region 302.

Embodiments of the present disclosure may be included in wave guide or other head mounted displays. Embodiments of a compensation algorithm may match the orientation of text to the horizon, fix the text to a location in the user scene for small head movements, de-bounce the rendered image during user movement, etc.

It is believed that the inventive concepts disclosed herein and many of their attendant advantages will be understood by the foregoing description of embodiments of the inventive concepts disclosed, and it will be apparent that various changes may be made in the form, construction, and arrangement of the components thereof without departing from the broad scope of the inventive concepts disclosed herein or without sacrificing all of their material advantages; and individual features from various embodiments may be combined to arrive at other embodiments. The form herein before described being merely an explanatory embodiment thereof, it is the intention of the following claims to encompass and include such changes. Furthermore, any of the features disclosed in relation to any of the individual embodiments may be incorporated into any other embodiment.

What is claimed is:

1. A computer apparatus comprising:
a heads-up display element configured to be retained in a fixed relative location with respect to a user's eye;
at least one position and orientation element, including one or more terrain tracking cameras; and
at least one processor in data communication with the heads-up display element, the at least one position and orientation element, and a memory storing processor executable code for configuring the at least one processor to:
define a useable region within the heads-up display element;
define at least one buffer region disposed around the useable region;
identify a terrain anchor via the one or more terrain tracking cameras;
render an image stream in the useable region at a fixed relative location with respect to the terrain anchor;
continuously receive position and orientation data from the at least one position and orientation element;
translate the useable region within the at least one buffer region to compensate for changes in position based on the position and orientation data to retain the image stream at the fixed relative location with respect to the terrain anchor;
identify a movement that exceeds the at least one buffer region based on the position and orientation data;
allow the useable region to de-render via translation outside a viewable area the heads-up display element;
identify a new terrain anchor via the one or more terrain tracking cameras;
smoothly translate the useable region back to the viewable area over time; and
render the image stream in the useable region at a fixed relative location with respect to the new terrain anchor.

2. The computer apparatus of claim 1, wherein the at least one processor is further configured to:
rotate the useable region within the at least one buffer region to compensate for changes in orientation based on the position and orientation data.

3. The computer apparatus of claim 1, wherein the at least one processor is further configured to:
continuously monitor a maximum shift in position or orientation based on the position and orientation data for a defined time period; and
scale the useable region to minimize the at least one buffer region based on the maximum shift in position or orientation.

4. The computer apparatus of claim 1, wherein smoothly translating the useable region back to the viewable area over time comprises employing a time-based translation function configured to simulate dragging the useable region through space at a defined speed.

5. The computer apparatus of claim 1, wherein the at least one position and orientation element comprises one or more microelectromechanical motion tracking devices.

6. A method comprising:
defining a useable region within a heads-up display element;
defining at least one buffer region disposed around the useable region;
identifying a terrain anchor via one or more terrain tracking cameras;
rendering an image stream in the useable region;
continuously receiving position and orientation data from at least one position and orientation element;
translating the useable region within the at least one buffer region to compensate for changes in position based on the position and orientation data to retain the image stream at the fixed relative location with respect to the terrain anchor;
identifying a movement that exceeds the at least one buffer region based on the position and orientation data;
allowing the useable region to de-render via translation outside a viewable area the heads-up display element;
identifying a new terrain anchor via the one or more terrain tracking cameras.

7. The method of claim 6, further comprising:
rotating the useable region within the at least one buffer region to compensate for changes in orientation based on the position and orientation data.

8. The method of claim 6, further comprising:
continuously monitoring a maximum shift in position or orientation based on the position and orientation data for a defined time period; and
scale the useable region to minimize the at least one buffer region based on the maximum shift in position or orientation.

9. The method of claim 6, wherein smoothly translating the useable region back to the viewable area over time comprises employing a time-based translation function configured to simulate dragging the useable region through space at a defined speed.

10. A heads-up system comprising:
a heads-up display element configured to be retained in a fixed relative location with respect to a user's eye;
at least one position and orientation element, including one or more terrain tracking cameras; and
at least one processor in data communication with the heads-up display element, the at least one position and orientation element, and a memory storing processor executable code for configuring the at least one processor to:
define a useable region within the heads-up display element;
define at least one buffer region disposed around the useable region;
identify a terrain anchor via the one or more terrain tracking cameras;
render an image stream in the useable region at a fixed relative location with respect to the terrain anchor;
continuously receive position and orientation data from the at least one position and orientation element;
translate the useable region within the at least one buffer region to compensate for changes in position based on the position and orientation data to retain the image stream at the fixed relative location with respect to the terrain anchor;
identify a movement that exceeds the at least one buffer region based on the position and orientation data;
allow the useable region to de-render via translation outside a viewable area the heads-up display element;
identify a new terrain anchor via the one or more terrain tracking cameras.

11. The heads-up system of claim 10, wherein the at least one processor is further configured to:
rotate the useable region within the at least one buffer region to compensate for changes in orientation based on the position and orientation data.

12. The heads-up system of claim 10, wherein the at least one processor is further configured to:
- continuously monitor a maximum shift in position or orientation based on the position and orientation data for a defined time period; and
- scale the useable region to minimize the at least one buffer region based on the maximum shift in position or orientation.

13. The heads-up system of claim 10, wherein smoothly translating the useable region back to the viewable area over time comprises employing a time-based translation function configured to simulate dragging the useable region through space at a defined speed.

14. The heads-up system of claim 10, wherein the at least one position and orientation element comprises one or more microelectromechanical motion tracking devices.

15. The heads-up system of claim 10, wherein the at least one position and orientation element comprises:
- one or more microelectromechanical motion tracking devices.

16. The heads-up system of claim 15, wherein the at least one processor is further configured to:
- resolve position and orientation data from the one or more terrain tracking cameras; and one or more microelectromechanical motion tracking devices with respect to each other.

* * * * *